US006868766B1

(12) United States Patent
Sellers et al.

(10) Patent No.: US 6,868,766 B1
(45) Date of Patent: Mar. 22, 2005

(54) KNIFE HOLDER

(75) Inventors: Jerry B. Sellers, Denver, NC (US); James A. Willis, Winston Salem, NC (US); Patsy H. Smith, Hickory, NC (US)

(73) Assignee: Burris Machine Company, Inc., Hickory, NC (US)

( * ) Notice: Subject to any disclaimer, the term of this patent is extended or adjusted under 35 U.S.C. 154(b) by 89 days.

(21) Appl. No.: 10/264,330

(22) Filed: Oct. 3, 2002

(51) Int. Cl.[7] .......................... B23D 19/00; B26D 1/14; B23B 35/00; F16B 21/00

(52) U.S. Cl. ............................ 83/481; 83/504; 83/505; 83/508.3; 83/676; 83/698.31; 83/698.51; 144/237; 403/322.4

(58) Field of Search .......................... 83/481, 482, 505, 83/506, 504, 508.1, 563, 676, 698.41, 508.3, 698.31, 425.4, 498, 499, 698.11, 698.51, 425.3; 144/237; 403/322.4

(56) References Cited

U.S. PATENT DOCUMENTS 263,983 A 9/1882 Spooner
1,184,853 A * 5/1916 Hobbs ......................... 83/481
1,781,833 A 11/1930 Cummer
2,438,235 A 3/1948 Strom
2,705,125 A 3/1955 Weise
2,753,631 A 7/1956 Culver
2,796,933 A * 6/1957 De Gelleke .................. 83/506
2,802,528 A * 8/1957 Mastriani ..................... 83/482
2,997,906 A * 8/1961 Burk et al. ................... 83/506
3,199,838 A 8/1965 Gillen
3,380,330 A * 4/1968 Gilmore ...................... 83/482
3,613,283 A 10/1971 Mozev, Jr.
3,777,607 A * 12/1973 Schofield ..................... 83/482
3,905,264 A * 9/1975 Eddy ........................... 83/481
4,054,994 A 10/1977 Grossman
4,161,898 A * 7/1979 Wingen ....................... 83/171
4,213,241 A 7/1980 Haapala
4,438,673 A * 3/1984 Noffke et al. ................. 83/502
4,561,335 A * 12/1985 Wingen ....................... 83/481
4,741,234 A * 5/1988 Colombo ..................... 83/481
5,237,900 A * 8/1993 Supe-Dienes et al. ........ 83/563
5,373,642 A 12/1994 Supe-Dienes
6,327,950 B1 * 12/2001 Huhn et al. ................... 83/481
6,463,838 B2 * 10/2002 Hsu ............................ 83/481

FOREIGN PATENT DOCUMENTS

DE 23 40 804 2/1979

* cited by examiner

*Primary Examiner*—Allan N. Shoap
*Assistant Examiner*—Jason Prone

(57) ABSTRACT

A knife holder is provided which can be readily disassembled and maintained while remaining in a knife bank. Fasteners keep the cylinder housing and blade housing securely connected and are aligned parallel to the longitudinal axis of the knife holder for easy access while in the knife bank. The fasteners can be removed using a manual driver without the necessity of removing the knife holder bank from the web equipment.

9 Claims, 4 Drawing Sheets

KNIFE HOLDER

FIELD OF INVENTION

The invention herein pertains to knife bank assemblies as are used in machinery for slitting web materials such as textiles, paper, plastic film, metal foil and the like. The knife bank assemblies are joined with fasteners positioned parallel to the longitudinal axis of the knife-holders and perpendicular to the blade axle for easy access.

DESCRIPTION OF THE PRIOR ART AND OBJECTIVES OF THE INVENTION

The processing and slitting of web materials such as textiles, paper, plastic films, foils and the like in recent years has become increasingly competitive causing plants and factories to search for ways to reduce costs and improve production efficiency. Slitting operations using banks of multiple knife holders have come under intense scrutiny since a single worn or broken knife holder in a typical knife bank can halt production of the entire slitting or trimming operation for indeterminate periods and causing excessive waste and downtime. Oftentimes one or more blades will become dull and require replacing. The blades may be replaced without disassembling the knife bank though the bank may have to be removed from the slitting machine. When internal parts become worn or defective, there is little choice but to remove the knife bank from the machine and disassemble the knife bank up to the point of the defective knife holder. A great amount of time and labor is required to align a new knife bank since all knife holders must be equally and properly spaced within the bank. Needless to say, the removal of a single knife holder from the bank or removal of the entire bank from the slitting operation is labor intensive and expensive even with scheduled periodic maintenance of the knife bank assemblies.

Thus, with the problems and disadvantages of maintaining knife banks, the present invention was conceived and one of its objectives is to provide a knife holder and method whereby a knife holder can be quickly repaired and maintained without the necessity of disassembling the entire bank.

It is yet another objective of the present invention to provide a knife holder having a cylinder housing affixed to a blade housing by utilizing fasteners which are aligned parallel to the longitudinal axis of the knife holder.

It is another objective of the present invention to provide a cylindrical housing having a pair of depending mounting lugs which include threaded channels for attachment to the blade housing.

It is yet another objective of the present invention to provide a pair of F-shaped spring retainers within the blade housing for receiving threaded fasteners used to secure the cylinder housing thereto.

It is still another objective of the present invention to provide a method for maintaining a knife holder while in a knife bank facilitating access thereto and allowing the assembly components to be readily repaired without removal or disturbing the position of the knife holder in the bank.

Various other objectives and advantages of the present invention will become apparent to those skilled in the art as a more detailed description is set forth below.

SUMMARY OF THE INVENTION

The aforesaid and other objectives are realized by providing a knife holder and method as used in a knife bank for continuous slitting thin web materials such as textiles, paper, metal foil, plastic film or the like. The knife holder includes a cylinder housing affixed to a blade housing. The cylinder housing has a pair of depending mounting lugs with fastener channels, which are parallel to the longitudinal axis of the knife holder and perpendicular to the blade axle. The blade housing is conventional having a pair of aligned plates spaced from one another in separate parallel planes and joined to one another by fasteners therebetween. F-shaped spring retainers contained within the blade housing receive the cylinder housing mounting lugs and define fastener channels whereby threaded fasteners such as machine screws can be inserted between the plates of the blade housing through the F-shaped spring retainers into the fasteners channels to secure the cylinder housing to the blade housing. By so positioning the fasteners, a tool such as a screw driver or the like can be used in the space confines of the knife bank for removing or repairing individual knife holders without requiring the knife holder to be removed from the knife bank.

The method of use allows maintenance of an individual knife holder while the knife bank is intact whereby individual knife holder components can be removed, replaced or repaired while the blade housing remains in place. Labor and equipment downtime is thus greatly reduced and the need for realigning and properly spacing the blades within the knife bank is eliminated.

DETAILED DESCRIPTION OF THE PREFERRED EMBODIMENTS AND OPERATION OF THE INVENTION

Figure 1:
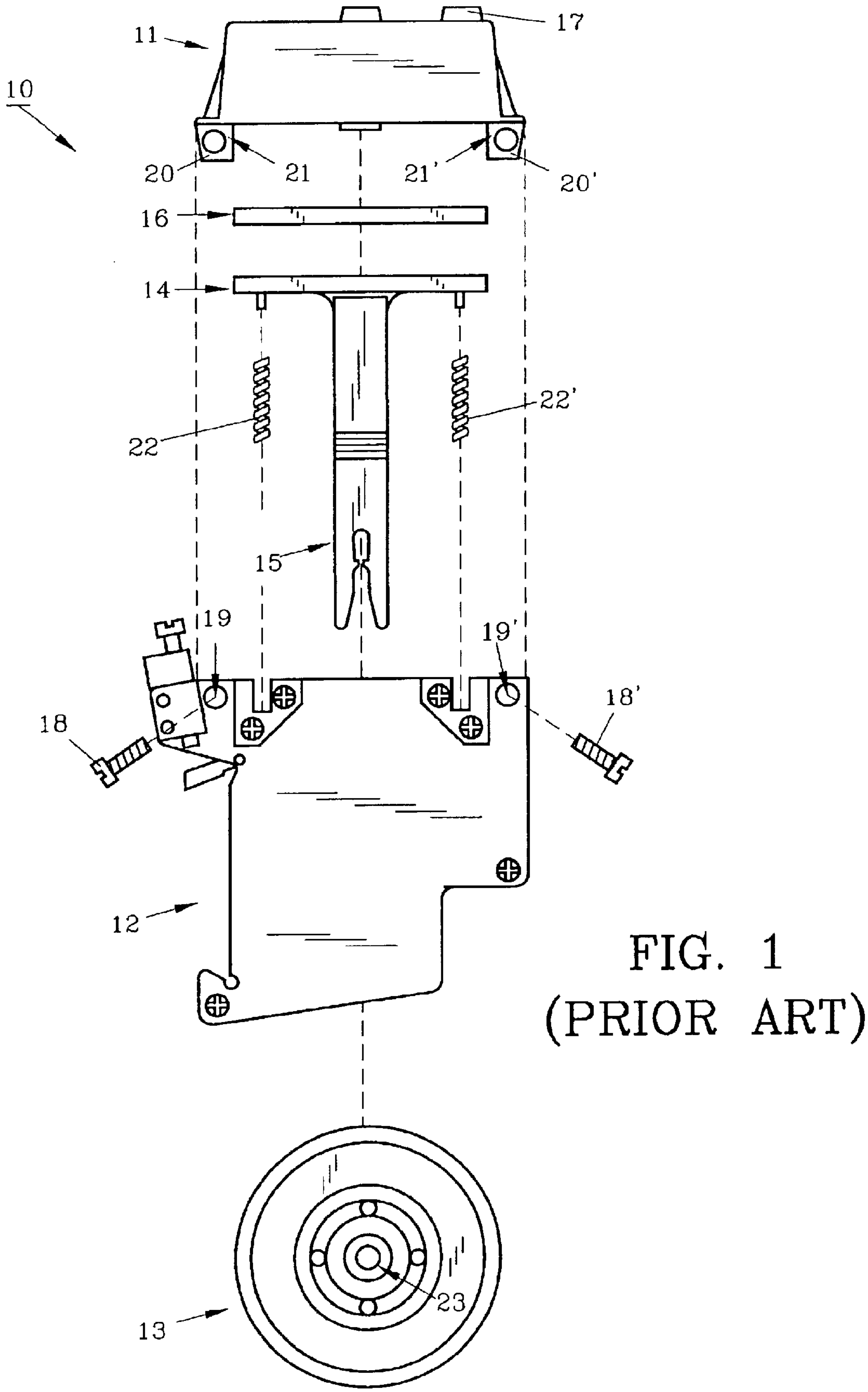
FIG. 1 (PRIOR ART)
FIG. 1 illustrates a side view of a typical knife holder as forms part of the prior art, in exploded fashion.

For a better understanding of the invention and its operation, turning now to the drawings, FIG. 1 illustrates knife holder 10 in exploded fashion as has been used in the industry for many years. As shown, old knife holder 10 includes cylinder housing 11, blade housing 12, disk blade 13 and piston 14, which are joined to fork 15. Elastomeric seal 16 prevents leakage of air or other fluid, which is delivered to the fluid port 17. As is conventional, fluid pressure at port 17 urges seal 16 and piston 14 downwardly thereby forcing disk blade 13 through paper or other materials being slit. Coil springs 22, 22' urge blade 13 (upwardly in FIG. 1) away from material being slit such as paper 45 shown in FIG. 3 when fluid pressure is not applied at port 17. Blade housing 12 is joined to cylinder housing 11 by machine screws 18, 18' which pass through apertures 19, 19' in blade housing 12 and through apertures 21, 21' of cylinder housing lugs 20, 20'. Machine screws 18, 18' are axially aligned and parallel with blade axle 23 as assembled during normal slitting operations.

Figure 3:
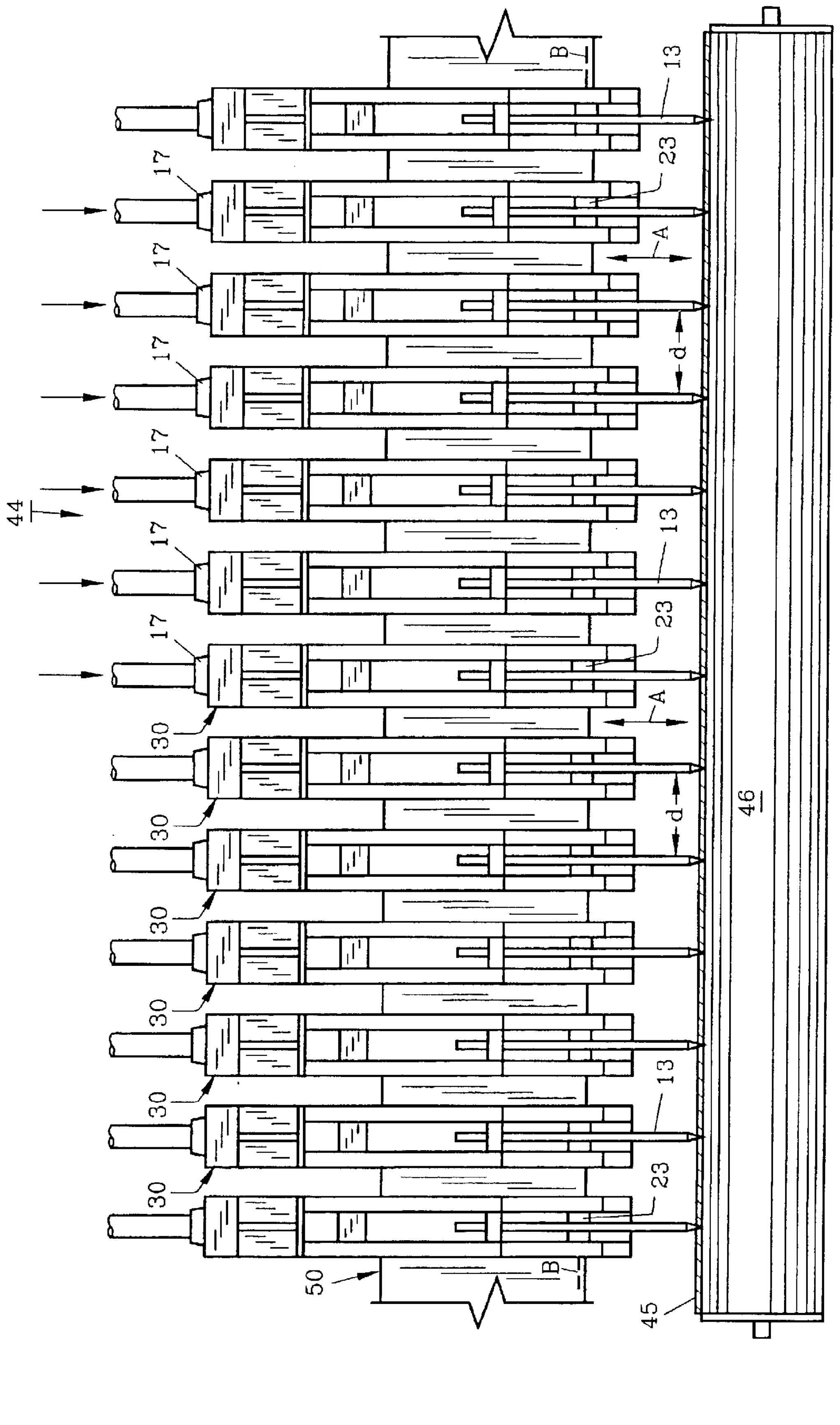
FIG. 3 features a front view of a knife bank during the slitting operation.

Knife holders are generally configured in banks as shown in FIG. 3 for cutting web materials which may vary in spacing from only a few millimeters to several meters in width, depending on the requirement of a particular job. Ten to twenty knife holders 30 are typical in a usual knife bank.

Figure 2:
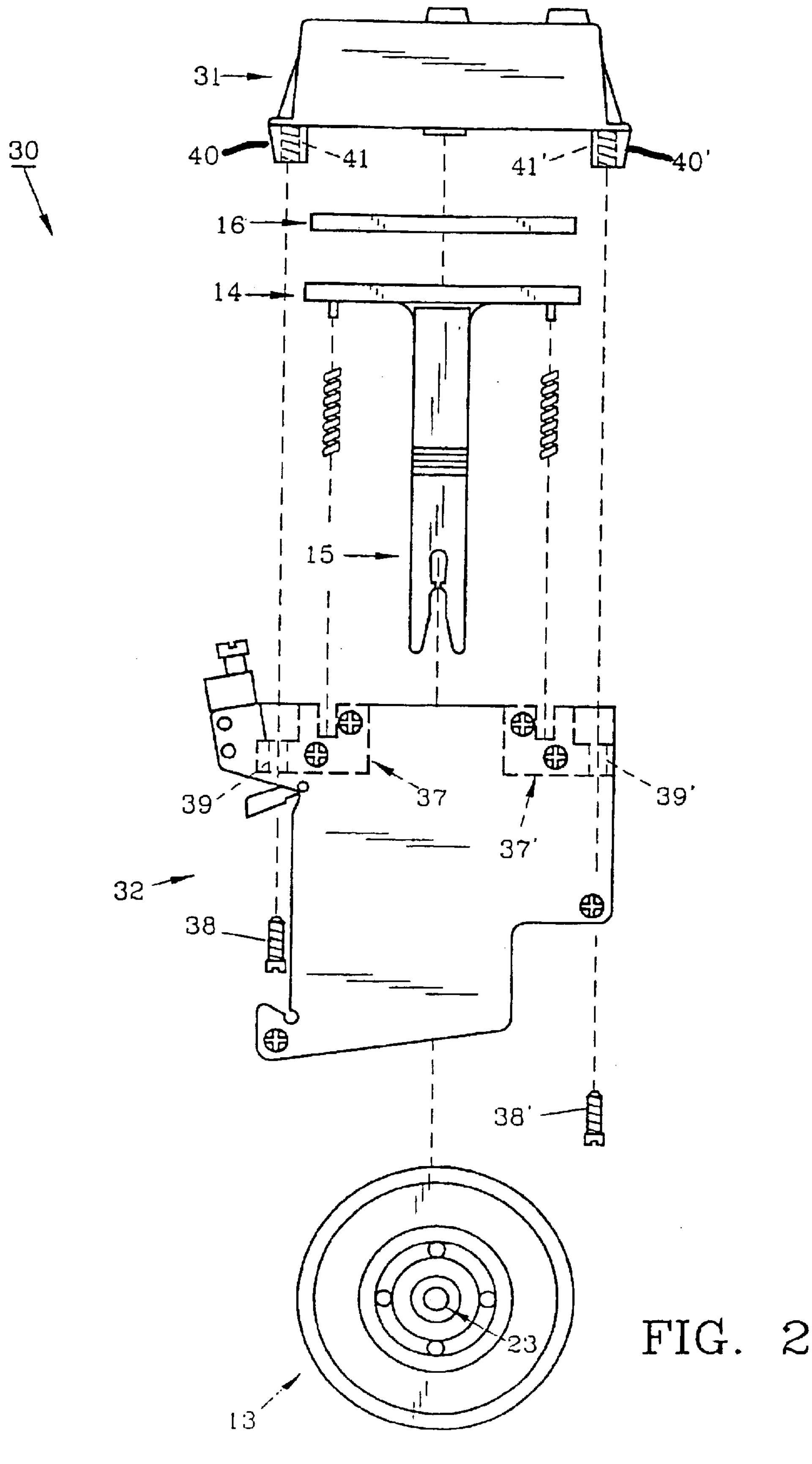
FIG. 2 shows the knife holder of the invention, also in an exploded side view.

In FIG. 2, preferred knife holder 30 is shown in exploded fashion for clarity with cylinder housing 31 and blade housing 32. Cylinder housing 31 includes depending mounting lugs 40, 40' for insertion in blade housing 32. Fasteners such as machine screws 38, 38' can be urged through channels 39, 39' of F-shaped spring retainers 37, 37' where they pass into treaded channels 41, 41' respectively of cylinder housing 31. As shown, channels 39, 39', 41, 41' are positioned normal or perpendicular to blade axle 23 of blade 13 as shown in FIG. 2 with channels 39, 39' in respectively, spring retainers 37, 37' mounted within blade housing 32. As hereinafter explained, the perpendicular or vertical alignment of fasteners 38, 38' as shown in FIG. 2 allows maintaining and repairing of knife holder 30 in a more convenient manner as knife holder 30 operates in knife back 44 seen in FIG. 3, in a constrained space.

Figure 4:
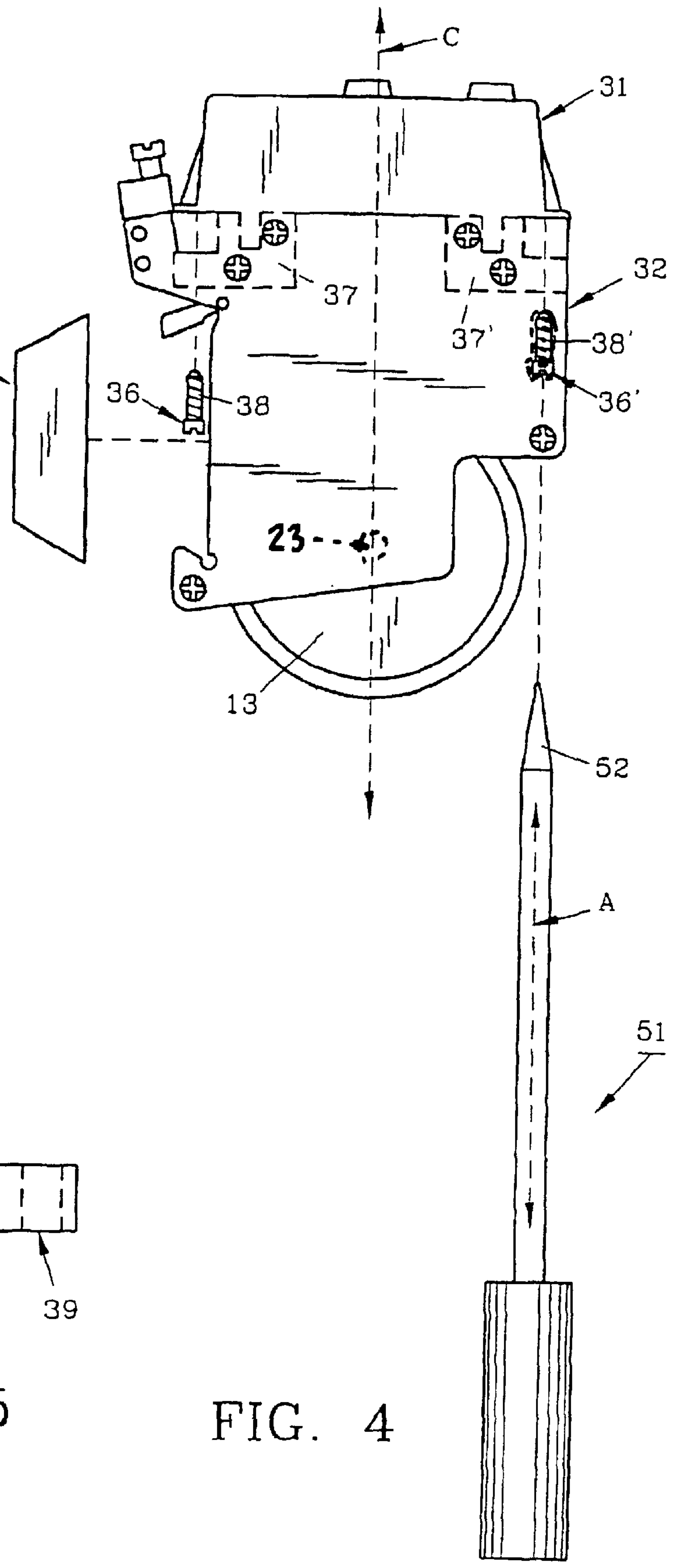
FIG. 4 demonstrates the knife holder as shown in FIG. 2 with a manual driver for the fastener.

In FIG. 4, knife holder 30 is shown ready for placement on dovetail bar 50 seen in FIG. 3 of sufficient length to accommodate multiple knife holders 30 of preferred knife bank 44 as may be used to slit paper web 45. Paper web 45 is supported by roller 46 as seen therein during slitting.

As further shown in FIG. 4, driver 51 may be a conventional screwdriver or similar device and is aligned in FIG. 4 with its longitudinal axis A perpendicular to longitudinal axis B (FIG. 3) of axles 23 and knife blades 13. Thus, driver 51 can be brought into contact with machine screw 38' by inserting tip 52 into head 36' of machine screw 38' for rotating the same. By manual driver 51 so positioned, as shown in FIG. 4 knife holder 30 can be easily repaired and maintained without the necessity of removal of each knife holder 30 from knife bank 44, thereby preventing inadvertent misalignment of knife holders 30 there along. Misalignment would create variations in the distances "d" between knife blades 13 as shown in FIG. 3, which can result in improper slitting widths and excessive waste, depending on particular job specifications.

Figure 5:
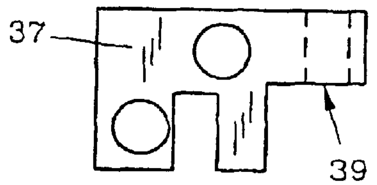
FIG. 5 depicts an enlarged view of the F-shaped spring retainer seen in FIG. 4.

In FIG. 5 spring retainer 37 is shown in enlarged fashion to illustrate its F-shaped configuration. This configuration provides room for channel 39 therein for receiving machine screw 38 in FIG. 2.

The preferred method of maintaining knife holder 30 as shown in FIG. 2 during slitting operation with the web equipment halted includes the steps of removing cylinder housing 31 by extracting fasteners 38, 38' using a driver such as manual driver 51 as shown in FIG. 4. Driver 51 is placed with tip 52 in contact with for example 38' within head 36' and by manual rotation, fastener 38' is removed from spring retainer 37'. Next, driver 51 is similarly placed within head 36 of fastener 38 and is likewise manually rotated for removal of fastener 38. Longitudinal axis A as shown in FIG. 4 of driver 51 is maintained in a parallel alignment with longitudinal axis C of knife holder 30, also shown in FIG. 4. Next, with threaded fasteners 38, 38' removed, cylinder housing 31 can then be lifted upwardly from blade housing 32 as shown in FIG. 2 whereby seal 16, piston 14 and fork 15 can be easily removed, repaired or otherwise.

Once required maintenance, repairs or replacements have been completed, knife holder 30 may be reassembled and can be returned to operation without removal of blade housing 32 from knife bank assembly 44 as shown in FIG. 3, thus greatly lessening the work and downtime necessary.

The illustrations and examples provide herein are for explanatory purposes and are not intended to limit the scope of the appended claims.

We claim:

1. A knife holder for slitting web material comprising: a circular blade, a blade housing, said circular blade contained within said blade housing, a piston, a slotted fork, said slotted fork attached to said piston, a blade axle, said circular blade mounted on said blade axle, said blade axle supported within said slotted fork, a cylinder housing, said cylinder housing defining a fluid port and a pair of mounting lugs, said mounting lugs each defining a threaded lug channel, each of said threaded lug channels normal to said blade axle, said threaded lug channels terminating within said mounting lugs, a pair of spring retainers, said spring retainers positioned within said blade housing for guiding said mounting lugs therein, said spring retainers each defining a fastener channel, each of said fastener channels extending completely through said spring retainers for axial alignment with different ones of said threaded lug channels, each of said spring retainers engaging different ones of said mounting lugs, a pair of fasteners, each of said fasteners sliding through different ones of said fastener channels and engaging different ones of said threaded lug channels for securing said cylinder housing to said spring fasteners whereby said fasteners are accessible in said blade housing.

2. The knife holder of claim 1 wherein each of said spring retainers has an "F" shape.

3. The knife holder of claim 1 wherein said fastener channels are perpendicular to said blade axle.

4. The knife holder of claim 1 wherein each of said fasteners comprises a threaded member, each of said threaded members comprises a head, said fastener channels having a diameter less than said heads, each of said heads engageable with different ones of said fastener channels.

5. The knife holder of claim 4 wherein each of said fasteners comprises a machine screw.

6. In a knife holder for slitting web material of the type in which a disk blade is mounted on a blade axle supported within a slotted fork attached to a piston contained within a conventional two plate blade housing where the blade housing receives a cylinder housing attached thereto by a pair of machine screws axially aligned and parallel with the blade axle, wherein the improvement comprises: the cylinder housing defining a pair of depending mounting lugs, each of said mounting lugs defining a threaded channel, each of said threaded lug channels normal to the blade axle, a pair of spring retainers positioned in the blade housing, each of said mounting lugs received in the blade housing by different ones of said spring retainers, said spring retainers each defining a fastener channel, each of said fastener channels extending completely through different ones of said spring retainers for axial alignment with different ones of said threaded lug channels, a pair of fasteners, each of said fasteners further comprising a threaded member, a head, said head affixed to said threaded member, said fastener channels each having a diameter less than each of said heads, each of said threaded members sliding perpendicular to the blade axle between the blade housing plates through different ones of said fastener channels and engaging different ones of said threaded lug channels, each corresponding head of each of said fasteners engaging different ones of said fastener channels for securing the cylinder housing to said spring retainers in the blade housing whereby said fasteners are accessible between the blade housing plates.

7. The improved knife holder of claim 6 wherein said threaded lug channels terminate within said mounting lugs.

8. The improved knife holder of claim 6 wherein each of said fasteners comprises a machine screw.

9. The improved knife holder of claim 6 wherein said fastener channels are perpendicular to the blade axle.

* * * * *